US008570929B2

(12) United States Patent
Yamada

(10) Patent No.: US 8,570,929 B2
(45) Date of Patent: *Oct. 29, 2013

(54) RELAY APPARATUS, COMMUNICATION APPARATUS, COMMUNICATION SYSTEM, AND RELAY METHOD

(75) Inventor: Daisuke Yamada, Nagoya (JP)

(73) Assignee: Buffalo Inc., Nagoya (JP)

( * ) Notice: Subject to any disclaimer, the term of this patent is extended or adjusted under 35 U.S.C. 154(b) by 229 days.

This patent is subject to a terminal disclaimer.

(21) Appl. No.: 13/096,782

(22) Filed: Apr. 28, 2011

(65) Prior Publication Data

US 2011/0268009 A1 Nov. 3, 2011

(30) Foreign Application Priority Data

Apr. 30, 2010 (JP) ................................. 2010-104790

(51) Int. Cl.
*H04H 20/71* (2008.01)
(52) U.S. Cl.
USPC ........... 370/312; 370/392; 370/315; 370/390; 370/349
(58) Field of Classification Search
USPC .......................... 370/312, 392, 315, 390, 349
See application file for complete search history.

(56) References Cited

U.S. PATENT DOCUMENTS

| | | | | |
|---|---|---|---|---|
| 6,798,773 B2 * | 9/2004 | Trossen et al. | ................ | 370/390 |
| 7,505,447 B2 * | 3/2009 | Kish et al. | ................ | 370/349 |
| 7,720,057 B2 * | 5/2010 | Igarashi | ................ | 370/389 |
| 8,270,425 B2 * | 9/2012 | Poola et al. | ................ | 370/432 |
| 8,295,219 B2 * | 10/2012 | Moon | ................ | 370/312 |
| 2009/0147718 A1 * | 6/2009 | Liu et al. | ................ | 370/312 |
| 2009/0262677 A1 * | 10/2009 | Banerjea et al. | ................ | 370/312 |
| 2010/0061285 A1 * | 3/2010 | Maeda et al. | ................ | 370/312 |
| 2010/0182944 A1 * | 7/2010 | Kish | ................ | 370/312 |

FOREIGN PATENT DOCUMENTS

| | | |
|---|---|---|
| JP | 2008-187626 | 8/2008 |
| JP | 2009-268124 | 11/2009 |
| WO | WO 2008/018130 | 2/2008 |
| WO | WO 2009/129367 | 10/2009 |

OTHER PUBLICATIONS

Notification of Reason of Rejection dated Apr. 10, 2012 from Japanese Application No. 2010-104790.

* cited by examiner

*Primary Examiner* — Rasheed Gidado
(74) *Attorney, Agent, or Firm* — Beyer Law Group LLP

(57) ABSTRACT

Disclosed is a relay apparatus for forwarding a received multicast frame to a communication apparatus at a specified communication rate. The relay apparatus converts the received multicast frame to the corresponding unicast frame, sets a relatively higher communication rate than the specified communication rate, and forwards the converted unicast frame to the communication apparatus at the relatively higher communication rate. The relay apparatus determines whether or not the availability of the converted and forwarded unicast frame by an application is ascertained based on a condition, and prohibits conversion to the unicast frame when the availability is negated. This configuration enhances the user's convenience in the relay technique of converting multicast frames to unicast frames and forwarding the converted unicast frames.

11 Claims, 9 Drawing Sheets

| r | STA1 Rate(Mbps) | STA2 Rate(Mbps) | STA3 Rate(Mbps) |
|---|---|---|---|
| 1 | 1 | 1 | 1 |
| 2 | 2 | 6 | 6 |
| 3 | 5.5 | 9 | 9 |
| 4 | 6 | 11 | 12 |
| 5 | 9 | 12 | 18 |
| 6 | 11 | 18 | 24 |
| 7 | 12 | 24 | 36 |
| ⋮ | ⋮ | ⋮ | ⋮ |

AVAILABLE RANGE FOR TRANSMISSION BY AP (UNIT TIME)

RELAY APPARATUS, COMMUNICATION APPARATUS, COMMUNICATION SYSTEM, AND RELAY METHOD

CROSS-REFERENCE TO RELATED APPLICATION

The present application claims priority from Japanese application P2010-104790A filed on Apr. 30, 2010, the content of which is hereby incorporated by reference into this application.

BACKGROUND

1. Field of the Invention

The present invention relates to a technique of relaying multicast frames.

2. Description of the Related Art

Wireless LAN adopts the IEEE 802.11 standard. The IEEE 802.11 standard specifies that an access point should use one of predetermined communication rates or BSS Basic Rate Set for forwarding multicast frames. A minimum value of the BSS Basic Rate Set is usually applied as the communication rate for forwarding multicast frames. This is ascribed to the fact that multicast frames are not subject to retransmission control. The access point may fail to forward a large volume of data, such as IPTV multicast stream data, with a sufficiently high quality to a wireless terminal. One technique has been proposed to cause the access point to convert a received multicast frame to a unicast frame and to forward the converted unicast frame to the wireless terminal at a higher communication rate than the preset communication rate for transmission of multicast frames.

This proposed technique may, however, reduce the user's convenience by conversion of multicast frames to unicast frames and transmission of the converted unicast frames. For example, a wireless terminal with installation of an application which is composed on the premise of reception of multicast frames may be incapable of utilizing received unicast frames converted from multicast frames. This problem is not restricted to the access point for a wireless LAN but is also found in any other communication apparatus, for example, PLC (Power Line Communications) modems.

SUMMARY

By taking into account at least part of the problem discussed above, there is a requirement of suppressing reduction of the user's convenience by conversion of multicast frames to unicast frames and transmission of the converted unicast frames.

In order to meet at least part of the requirement described above, the present invention provides various embodiments and applications described below.

A first aspect of the present invention is directed to a relay apparatus for forwarding a received multicast frame to a communication apparatus at a specified communication rate, comprising: a unicast forwarder for converting the received multicast frame to a unicast frame, for setting a relatively higher communication rate than the specified communication rate, and for forwarding the converted unicast frame to the communication apparatus at the relatively higher communication rate; a determiner for determining whether or not the converted and forwarded unicast frame is available by an application installed in the communication apparatus which utilizes the forwarded unicast frame, based on a specified condition; and a prohibiter for prohibiting the conversion of the multicast frame to the unicast frame when the determiner negates the availability.

The relay apparatus according to the first aspect of the invention converts a received multicast frame to a unicast frame, sets a relatively higher communication rate than a specified communication rate, and forwards the converted unicast frame to the communication apparatus at the relatively higher communication rate, thus the relay apparatus of this aspect enables adequate multicast communication of even a large volume of received data. The relay apparatus determines availability of the converted and forwarded unicast frame by the application and, prohibits conversion to the unicast frame upon determination of unavailability. The relay apparatus of this aspect effectively suppresses reduction of the user's convenience by conversion of multicast frames to unicast frames.

A second aspect of the present invention is directed to a relay apparatus in accordance with the first aspect, wherein the determiner includes: an acquirer for obtaining information which represents the presence of a function of receiving the converted unicast frame from the communication apparatus, and transferring the received unicast frame to the application; and the specified condition includes a functional condition that the communication apparatus has the specific function. The relay apparatus of the aspect obtains the specific information representing the presence or absence of the specific functions of receiving the converted unicast frame from another communication apparatus and transferring the received unicast frame to the application, and determines the availability of the unicast frame, based on the presence or absence of the specific function.

The relay apparatus accordingly does not send the converted unicast frame from multicast frame to a communication apparatus with an application incapable of utilizing unicast frames converted from multicast frames if the relay apparatus receives the unicast frames converted from multicast frame. The relay apparatus of this aspect avoids a potential unavailable state of frames relayed from the relay apparatus in the communication apparatus, thus preventing the degradation of the user's convenience.

A third aspect of the present invention is directed to a relay apparatus in accordance with the first aspect, wherein the determiner includes an estimator for estimating a duration required for the transmission of the converted unicast frame, and the specified condition includes a transmission available condition that the estimated duration is within an available range for transmission by the relay apparatus. The relay apparatus of the aspect estimates the duration required for transmission of the converted unicast frame and determines the availability of the unicast frame, based on the result of determination of whether the estimated duration is within the available range for transmission by the relay apparatus. The relay apparatus of this aspect prevents a significant dropout of frames to be received by the communication apparatus from being induced by conversion of multicast frames to unicast frames and transmission of converted unicast frames, thereby preventing the degradation of the user's convenience.

A fourth aspect of the present invention is directed to a relay apparatus in accordance with the third aspect, wherein if the transmission available condition is not satisfied, the determiner changes the communication rate of the converted unicast frame from the currently set value to a relatively higher value and performs a determination operation based on the transmission available condition again. The relay apparatus increases the frequency of forwarding the converted unicast frame under the condition that the estimated duration is within the available range for transmission by the relay apparatus, while avoiding a significant loss of frames to be received by the communication apparatus. This aspect increases the frequency of multicast communication of a large volume of data, thereby enhancing the user's convenience.

A fifth aspect of the present invention is directed to a relay apparatus in accordance with the forth aspect, wherein the determiner specifies the communication apparatus having the currently set communication rate lower than a predetermined threshold value as an object for changing the currently set communication rate and changes the currently set communication rate from the current value to the predetermined threshold value. If there is a communication apparatus, which operates at an extremely low communication rate, in the system of interest, it may happen that the availability in multicast communication of the whole system is lowered due to the presence of the very slowly operating communication apparatus. The relay apparatus of this aspect can prevent the availability from being lowered.

A sixth aspect of the present invention is directed to a relay apparatus in accordance with the forth aspect, wherein the relay apparatus communicates with a plurality of communication apparatuses, and the determiner selects one of the plural communication apparatuses as an object for a change of the communication rate, based partially on at least differences between the communication rates currently set in the plural communication apparatus and one-step higher communication rates respectively raised by one step from the currently set communication rates among available communication rates supported by the plural communication apparatuses, and changes the communication rate from the currently set value to the one-step higher value with regard to the selected communication apparatus. This aspect assures the greater effect of decreasing the estimated duration due to the change of the communication rate. Changing the communication rate to the relatively higher communication rate by a single step minimizes the influence on the availability of unicast frames by the selected communication apparatus as the object for a change of the communication rate.

A seventh aspect of the present invention is directed to a relay apparatus in accordance with the forth aspect, wherein the relay apparatus communicates with a plurality of communication apparatuses, and the determiner selects one of the plural communication apparatuses as an object for a change of the communication rate, based partially on at least successful reception rates of frames forwarded by the relay apparatus in the plural communication apparatuses, and changes the communication rate from the currently set value to the relatively higher value with regard to the selected communication apparatus. The relay apparatus of this embodiment selects one of communication apparatuses as the object for a change of the communication rate, based partially on at least the successful reception rates of the respective communication apparatuses. This aspect can effectively prevent the change of the communication rate from lowering the successful reception rate to such an extent as to significantly affect the availability of unicast frames.

A eighth aspect of the present invention is directed to a relay apparatus in accordance with the forth aspect, wherein the determiner repeats the change of the communication rate and the determination based on the transmission available condition until the transmission available condition has been fulfilled. The relay apparatus of this aspect prevents conversion of a received multicast frame to a unicast frame from being prohibited for the reason that the estimated duration is outside of the available range for transmission by the relay apparatus. This aspect increases the frequency of multicast communication of a large volume of data, thereby enhancing the user's convenience.

A ninth aspect of the present invention is directed to a communication apparatus, comprising: a receiver for receiving a unicast frame converted from a multicast frame; a notifier for notifying a relay apparatus, which is capable of converting a multicast frame to a unicast frame, of functional information used to identify the presence of a function of transferring the received unicast frame to an application installed in the communication apparatus to utilize the received unicast frame. The communication apparatus of the invention may be used in combination with the relay apparatus having any of the above configurations equipped with the determiner including the acquirer. Such combination avoids the unavailability of frames relayed from the relay apparatus in the communication apparatus, thus preventing the degradation of the user's convenience.

A tenth aspect of the present invention is directed to a communication apparatus in accordance with the ninth aspect, the communication apparatus being a wireless LAN terminal, wherein the notifier accomplishes the notification by including the functional information in the management frame transmitted to and from the relay apparatus. The communication apparatus of this aspect utilizes the management frame required for communication of the wireless LAN terminal to notify the relay apparatus of the functional information. There is accordingly no need of any specific communication for the purpose of only notification of the functional information. This aspect preferably simplifies the configuration of the communication apparatus and does not increase the network loading by additional notification.

The technique of the invention is not restricted to the relay apparatus or the communication apparatus having any of the configurations discussed above but may be realized (or embodied) by diversity of other applications, for example, a communication system including such a relay apparatus and such a communication apparatus, a multicast frame-relaying method adopted in the relay apparatus or in the communication system, a frame-receiving method adopted in the communication apparatus, and a program product, such as a recording medium, with a program for implementing the relevant functions recorded therein. The configuration in any of the aspects of the relay apparatus and the communication apparatus may be added to any of diversity of other applications.

DESCRIPTION OF THE PREFERRED EMBODIMENTS

A. First Embodiment

A-1. General Configuration of Wireless LAN System 20

Figure 1:
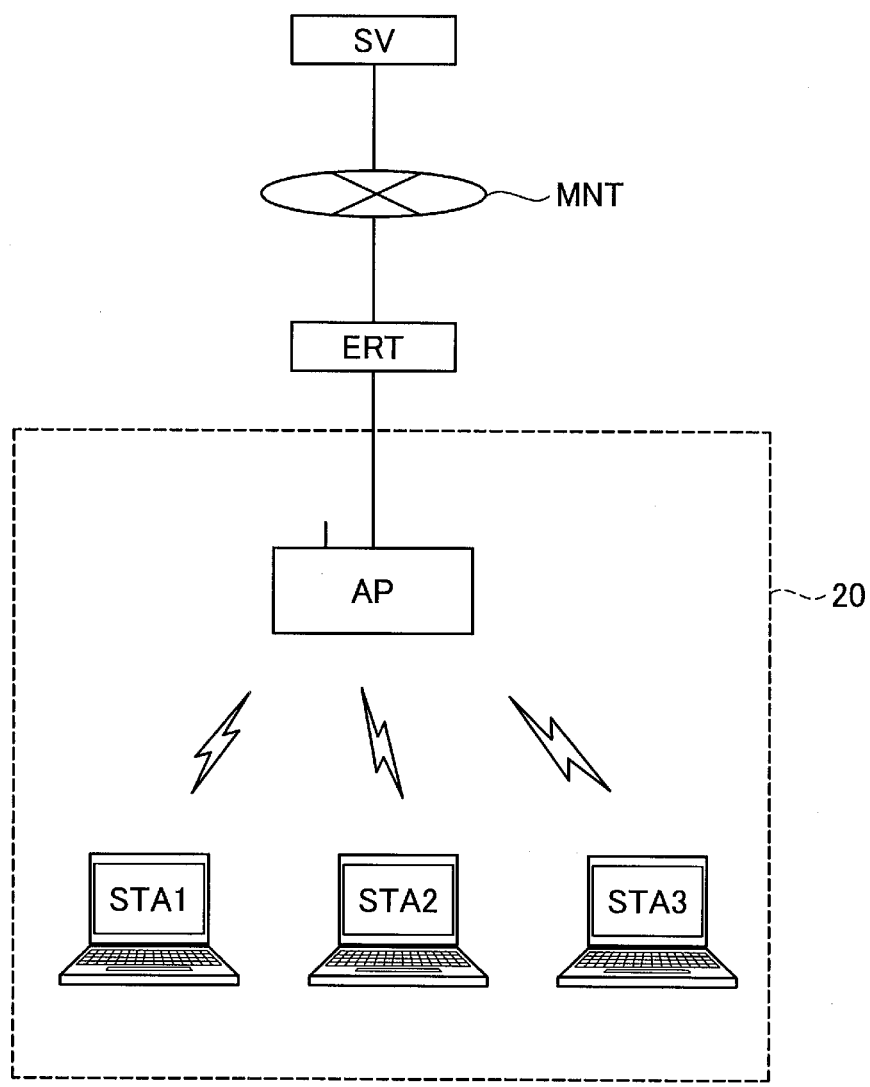
FIG. 1 schematically shows the general configuration of a wireless LAN system 20 according to one embodiment of the invention.

The present invention is described in detail below with reference to some embodiments thereof as illustrated in the accompanying drawings. FIG. 1 illustrates a wireless LAN system 20 as one embodiment of the communication system according to the invention. The wireless LAN system 20 comprises an access point AP and wireless terminals STA1 to STA3 and is in compliance with the IEEE 802.11 standard. The access point AP functions as a wireless base station for relaying communication between wireless client devices or wireless terminals and a bridge for connecting one wired LAN with another and is connected to a multicast network MNT via a wired edge router ERT. A server SV is connected to the multicast network MNT. The server SV provides multicast stream-based IPTV broadcast. In this embodiment, the access point AP and the edge router ERT adopt the IGMP (Internet Group Management Protocol) for controlling the reception of multicast frames.

In this embodiment, the wireless terminals STA1 to STA3 are general-purpose personal computers of an identical structure with a built-in wireless LAN module. Alternatively the wireless terminals STA1 to STA3 may be equipped with a wireless LAN card. The wireless terminals STA1 to STA3 can communicate with the access point AP in the infrastructure mode. The wireless terminals STA1 to STA3 can also receive and reproduce multicast frames of IPTV broadcast sent from the server SV via the access point AP, the edge router ERT, and the multicast network MNT.

Figure 2:
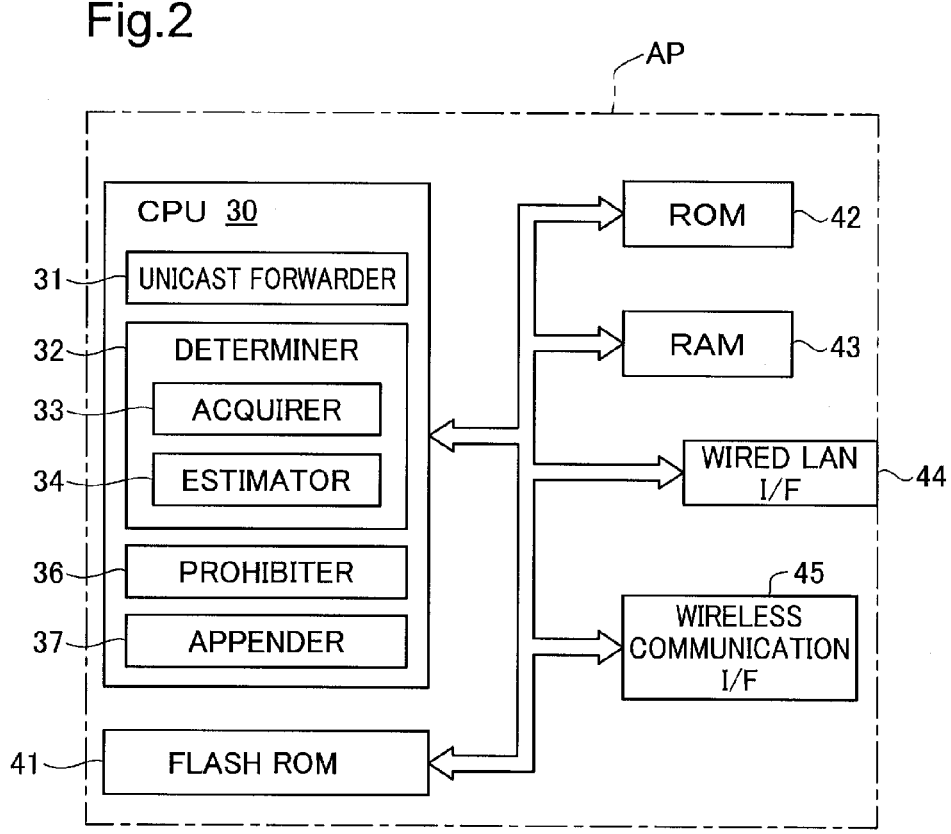
FIG. 2 shows in block diagram the general structure of an access point AP included in the wireless LAN system 20.

FIG. 2 shows in block diagram the general structure of the access point AP. As shown in FIG. 2, the access point AP comprises a CPU 30, a flash ROM 41, a ROM 42, a RAM 43, a wired LAN interface 44, and a wireless communication interface 45, which are all interconnected via a bus.

The CPU 30 loads and executes programs, such as firmwares, stored in the flash ROM 41 or in the ROM 42, onto the RAM 43 so as to control the overall operations of the access point AP. The CPU 30 also functions as a unicast forwarder 31, a determiner 32, a prohibiter 36, and an appender 37 by using a given program. The determiner 32 has the functions of an acquirer 33 and an estimator 34. The details of these functional blocks will be described later.

The wired LAN interface 44 serves for connection to a wired LAN. The wired LAN interface 44 is connected to the edge router ERT via a cable. The wireless communication interface 45 serves for wireless communication and functions as a wireless base station to transmit wireless packets to and receive ones from, the wireless terminals STA1 to STA3 as wireless client devices.

Figure 3:
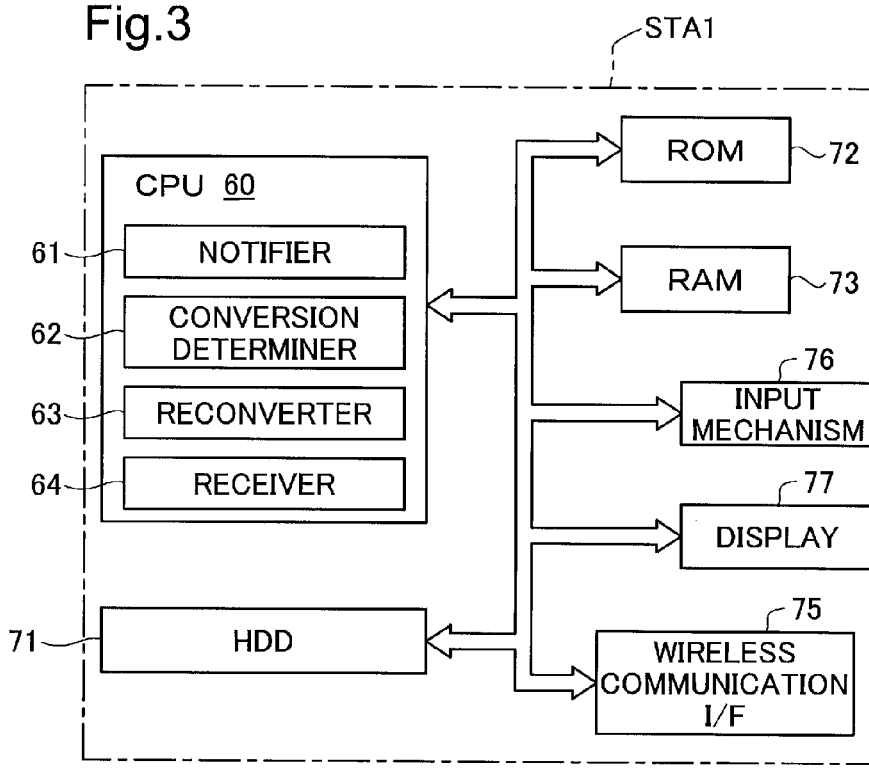
FIG. 3 shows in block diagram the general structure of a wireless terminal STA1 included in the wireless LAN system 20.

FIG. 3 shows in block diagram the general structure of the wireless terminal STA1 as a representative example of the wireless terminals STA1 to STA3 having the identical structure. The wireless terminal STA1 is a general-purpose personal computer with specific programs installed therein. As shown in FIG. 3, the wireless terminal STA1 comprises a CPU 60, a hard disk drive 71, a ROM 72, a RAM 73, an input mechanism 76, a display 77, and a wireless communication interface 75, which are all interconnected via a bus.

After power on, the CPU 60 loads and executes firmware or an OS (operating system) stored in the hard disk drive 71 or in the ROM 72, onto the RAM 73 so as to control the overall operations of the wireless terminal STA1. The CPU 60 executes a specific program stored in the hard disk drive 71 to serve as a notifier 61, a conversion determiner 62, a reconverter 63, and a receiver 64. The details of these functional blocks will be described later.

The hard disk drive 71 stores not only the specific program for implementing the functions of these functional blocks but also an application for reproducing IPTV broadcast (hereafter referred to briefly as 'application').

The input mechanism 76 includes a keyboard and a pointing device. The user gives an operational instruction to the wireless terminal STA1 via the input mechanism 76. The display 77 is a liquid crystal display. The wireless communication interface 75 is an interface for conducting wireless communication and functions as a wireless client device to transmit packets to and receives packets from, the access point AP as the wireless base station.

A-2. Stream-Receiving Process

Figure 4:
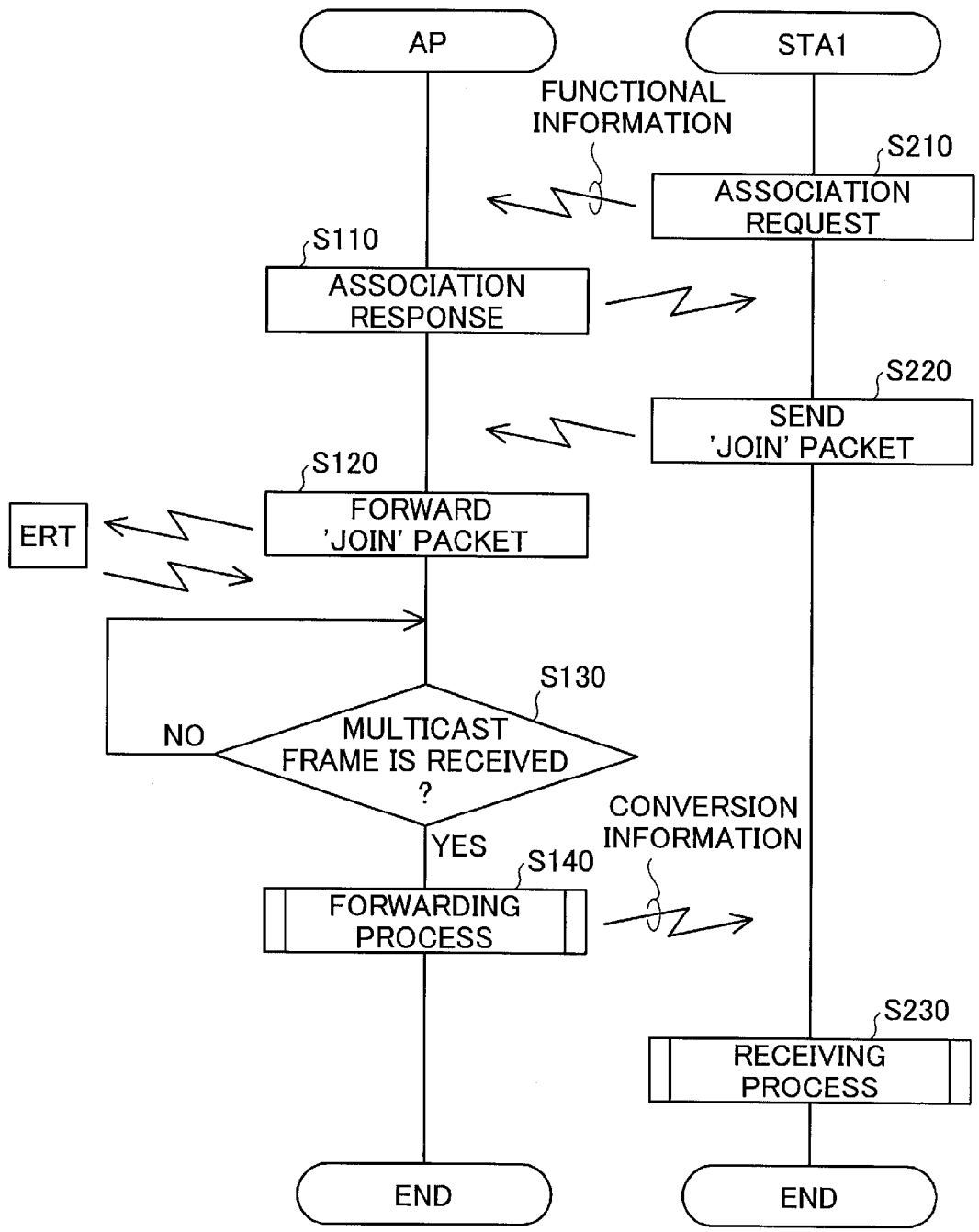
FIG. 4 is a flowchart for explaining the stream-receiving process performed in the wireless LAN system 20.

FIG. 4 is the flow chart of a stream-receiving process performed in the wireless LAN system 20. The stream-receiving process mentioned here means the process in which the wireless terminals STA1 to STA3 receive the contents of IPTV broadcast from the server SV via the access point AP and reproduce the received contents. For the simplicity of explanation, the following description presupposes that the wireless terminal STA1 receives the contents of IPTV broadcast, unless otherwise stated. In this embodiment, the stream-receiving process is started by the user causing the input mechanism 76 to send a start instruction for the stream-receiving process to the wireless terminal STA1.

As the stream-receiving process is started, the CPU 60 of the wireless terminal STA1 sends an association request to the access point AP as the wireless base station (step S210). The CPU 60 or specifically the notifier 61 sends the association request with functional information included therein. The functional information is used to identify whether the application in the wireless terminal STA1 can utilize (i.e., reproduce) the unicast frame, which is converted from the multicast frame received from the server SV and is sent to the wireless terminal STA1 by the access point AP according to a series of processing steps described later. To be concrete, the association request has a frame structure defined by the IEEE 802.11 standard. The frame element of the association request frame includes an optional area the content of which can be freely definable by a vender. The CPU 60 sends the association request with the functional information included in this optional area.

The functional information is explained more specifically below.

The application installed in the wireless terminal STA1 on the premise of reception of multicast frames may fail to reproduce a received unicast frame. The reproduction failure may be ascribed to, for example, the filtering function of the OS or operating system in the wireless terminal STA1 that discards an application-incompatible unicast frame prior to transmission to the application. Even in such a case, as long as the wireless terminal STA1 has the function of reconverting the received unicast frame to a multicast frame, the application can reproduce the reconverted multicast frame. The application installed without the adaptation to the multicast-frame streaming can reproduce the received unicast frame, independently of whether the wireless terminal STA1 has the reconverting function. The functional information represents an identifier for checking whether the wireless terminal STA1 has the function of utilizing or reproducing unicast frames. In this embodiment, a specific flag is set in the optional area when the wireless terminal STA1 has the function of utilizing unicast frames.

When the wireless terminal STA1 sends the association request with the functional information included therein, the CPU 30 of the access point AP receives the association request and sends back an association response to the wireless terminal STA1 (step S110). On the other hand, when the wireless terminal STA1 receives the association response to make connection with the access point AP, the CPU 60 of the wireless terminal STA1 sends a 'join' packet to the server SV to prepare for receiving IPTV broadcast (step S220).

The CPU 30 of the access point AP receives the 'join' packet and forwards the received 'join' packet to the edge router ERT (step S120). The edge router ERT receives this 'join' packet and further forwards the received 'join' packet to the server SV, while registering the wireless terminal STA1 as a member of a multicast group. Hereafter the edge router ERT forwards multicast stream data, with which the server SV provides the multicast network MNT, to the access point AP.

After forwarding the 'join' packet, the CPU 30 of the access point AP waits to receive any multicast frame as multicast stream data provided by the server SV (step S130). When receiving a multicast frame (step S130: Yes), the CPU 30 performs a forwarding process (step S140). The forwarding process selects either transmission of the received multicast frame without any processing or conversion of the received multicast frame into a unicast frame and subsequent transmission of the converted unicast frame, based on the unicast frame compatibility of each of the wireless terminals STA1 to STA3.

Figure 5:
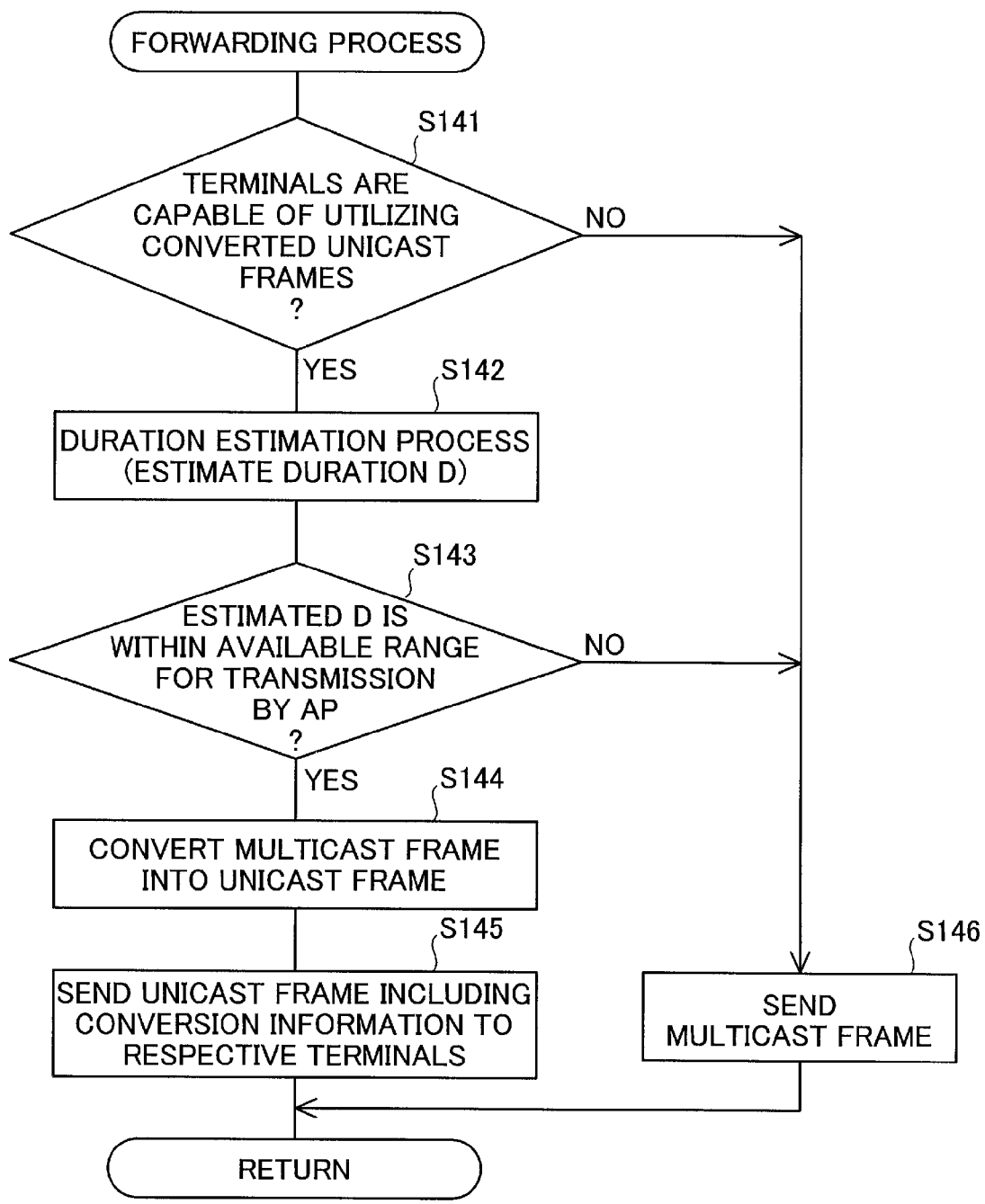
FIG. 5 is a flowchart for explaining the forwarding process performed in the stream-receiving process.

FIG. 5 is a flow chart for concretely explaining the details of the forwarding process. The following description presupposes that the wireless terminals STA1 to STA3 are respectively registered as members of the same multicast group. When the forwarding process is started, the CPU 30 of the access point AP or specifically the determiner 32 determines whether the wireless terminals STA1 to STA3 can utilize a forwarded unicast frame that is converted from a multicast frame received by the access point AP (step S141). The CPU 30, specifically the determiner 32 or more specifically its acquirer 33 performs the determination by obtaining and referring to functional information included in an association request sent by each of the wireless terminals STA1 to STA3 at step S210. In this embodiment, decision is made on whether all the wireless terminals STA1 to STA3 can utilize unicast frames.

When it is determined that all the wireless terminals STA1 to STA3 can utilize unicast frames (step S141: Yes), the CPU 30, specifically the determiner 32 or more specifically its estimator 34 performs a duration estimation process (step S142). The duration estimation process estimates a time occupancy or duration D for frame transmission when the CPU 30 converts a received multicast frame to a unicast frame and sends the converted unicast frame to the wireless terminals STA1 to STA3. In this embodiment, the duration D is estimated according to Expression (1) given below:

$$D = \sum_n (B(t)/T(n) + \delta(B(t))) \qquad (1)$$

In Expression (1), B(t) denotes the transmission capacity (Mb) of multicast frames to be forwarded per unit time (per second in this case), T(n) the preset communication rate (Mbps) in forwarding unicast frames to a selected wireless terminal STAn where 'n' is an integer of 1 to 3, and $\delta(B(t))$ the increment of B(t) due to overhead on CSMA/CA and header forwarding.

The transmission capacity B(t) can be calculated from the number of multicast frames received within a predetermined time period, (e.g. a predetermined time period during which a preset number of frames are received. The increment $\delta(B(t))$ may be a function obtained experimentally in advance.

The access point AP manages the communication rate T(n). To put it concretely, the access point AP manages communication rates supported by the respective wireless terminals STA1 to STA3, on the basis of management frames transmitted to and from the respective wireless terminals STA1 to STA3. The access point AP individually sets optimal communication rates in the respective wireless terminals STA1 to STA3 according to communication distances from the wireless terminals STA1 to STA3. Examples of the actual communication rates of the wireless terminals STA1 to STA3 managed by the access point AP is tabulated in FIG. 6. This table lists communication rates supported by the wireless terminals STA1 to STA3. The step number 'r' represents the number of steps by which each communication rate changes relative to the lowest communication rate (e.g., 1 Mbps) among the supported communication rates. Communication rates in hatched rectangles represent optimal communication rates respectively set in the wireless terminals STA1 to STA3 by the access point AP. For example, 6 Mbps is set as the optimal communication rate in the wireless terminal STA1, which is expressed by T(1)=6 Mbps.

Figures 6, 7:
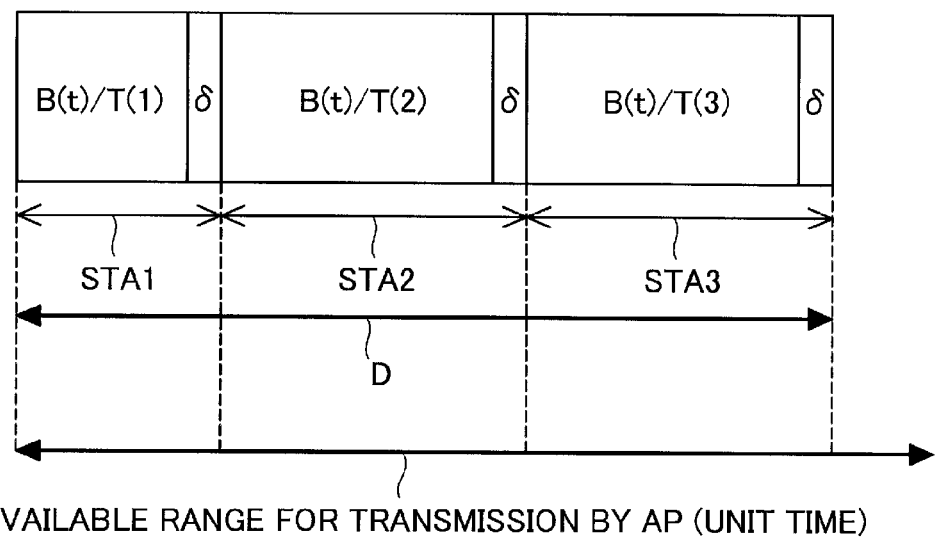
FIG. 6 is a table concretely showing communication rates supported by wireless terminals STA1 to STA3 and communication rates to be set in the wireless terminals STA1 to STA3.
FIG. 7 conceptually shows a method of estimating the duration for which the access point AP converts a received multicast frame into a unicast frame and forwards the converted unicast frame.

After the duration estimation process, the CPU 30 or specifically the determiner 32 determines whether the estimated duration D is within an available range for transmission by the access point AP (step S143). Expression (1) estimates the duration D on the basis of the transmission capacity per unit time. When the duration D is within the unit time (e.g., 1 second) as shown in FIG. 7, it is determined that the duration D is within the available range for transmission by the access point AP. The transmission capacity is determined by considering a duration relating to forwarding a frame required for communication management, so that the duration available for data forwarding is actually shorter than the unit time. The step S143 may be said to decide on the availability of frames by the application. When the estimated duration D is outside of the available range for transmission by the access point AP, there is a significant loss of frames to be received by the wireless terminal STA1. That is, the received frames can not be practically used by the wireless terminal STA1. The duration D outside of the available range for transmission by the access point AP is substantially equivalent to the unavailability of frames by the application. The availability of frames by the application in this embodiment accordingly means that the application sufficiently performs its functions of processing received frames with quality equivalent to or higher than the preset level.

When it is determined that the estimated duration D is within the available range for transmission by the access point AP (step S143: Yes), the CPU 30 or specifically the unicast forwarder 31 converts a received multicast frame into a unicast frame (step S144). To be concrete, the CPU 30 duplicates a received multicast frame and overwrites a multicast address included in the header of the duplicated multicast frame with the addresses of the respective wireless terminals STA1 to STA3.

After the conversion into the unicast frame, the CPU 30 or specifically the appender 37 includes information representing the execution of the conversion (hereafter referred to as 'conversion information') in the converted unicast frame, and the CPU 30 or specifically the unicast forwarder 31 sends the converted unicast frame with the conversion information included therein to the respective wireless terminals STA1 to STA3 (step S145). The unicast frame is sent at the communication rates set as the optimal communication rates in the respective wireless terminals STA1 to STA3 by the access point AP (communication rates in the hatched rectangles in FIG. 4). In this embodiment, a predefined special address is used as a destination address to include the conversion information in the unicast frame. The access point AP may store predefined special addresses received in advance from the respective wireless terminals STA1 to STA3. This arrangement enables each of the wireless terminals STA1 to STA3 to refer to a special address used as the destination address of each unicast frame and recognize whether the unicast frame is addressed to itself. The wireless terminals STA1 to STA3 may also be designed to prevent a multicast frame from being discarded by the filtering function of the OS described above. The inclusion of the conversion information is not restricted to this embodiment but may be implemented, for example, in Ethernet (registered trademark) frame (DIX) transmission, by including an identifier in a vender definable area in an EtherType field.

The above description presupposes that all the wireless terminals STA1 to STA3 belong to a multicast group. When only some of the wireless terminals STA1 to STA3 belong to the multicast group, the CPU 30 performs the duration estimation process and sends a unicast frame only to the wireless terminal as a member of the multicast group. This modification may be implemented by, for example, IGMP snooping.

If there is at least one wireless terminal incapable of utilizing unicast frames (step S141: No), on the other hand, a forwarded unicast frame converted from a multicast frame can not be used or reproduced by the wireless terminal. The conversion to a unicast frame thus degrades the user's convenience. If the estimated duration D is outside of the available range for transmission by the access point AP (step S143: No), there is a significant loss of frames to be received. The received frames cannot thus be practically used or reproduced by the wireless terminals STA1 to STA3. In these cases, the CPU 30 or specifically the prohibiter 36 prohibits the conversion of the received multicast frame to the corresponding unicast frame. That is, the CPU 30 forwards the received multicast frame at a preset communication rate (more specifically, at a communication rate preset for forwarding multicast frames) (step S146). In this embodiment, the preset communication rate is 1 Mbps.

In fact, the CPU 30 checks for the availability of the converted unicast frame by the wireless terminals STA1 to STA3 in steps S141 and S143, and when the availability is negated, the CPU 30 prohibits the conversion of the received multicast frame to the corresponding unicast frame, and forwards the received multicast frame to the wireless terminals STA1 to STA3. After the transmission of the unicast frame in step S145 or the multicast frame in step S146, the CPU 30 repeats the above-mentioned forwarding process until its next reception of a 'leave' packet from each of the wireless terminals STA1 to STA3.

The description of the stream-receiving process is resumed here with reference to FIG. 4. After sending the 'join' packet to become a member of the multicast group, the CPU 60 of the wireless terminal STA1 performs a receiving process (step S230). The receiving process is that which receives and reproduces stream data from the access point AP.

Figure 8:
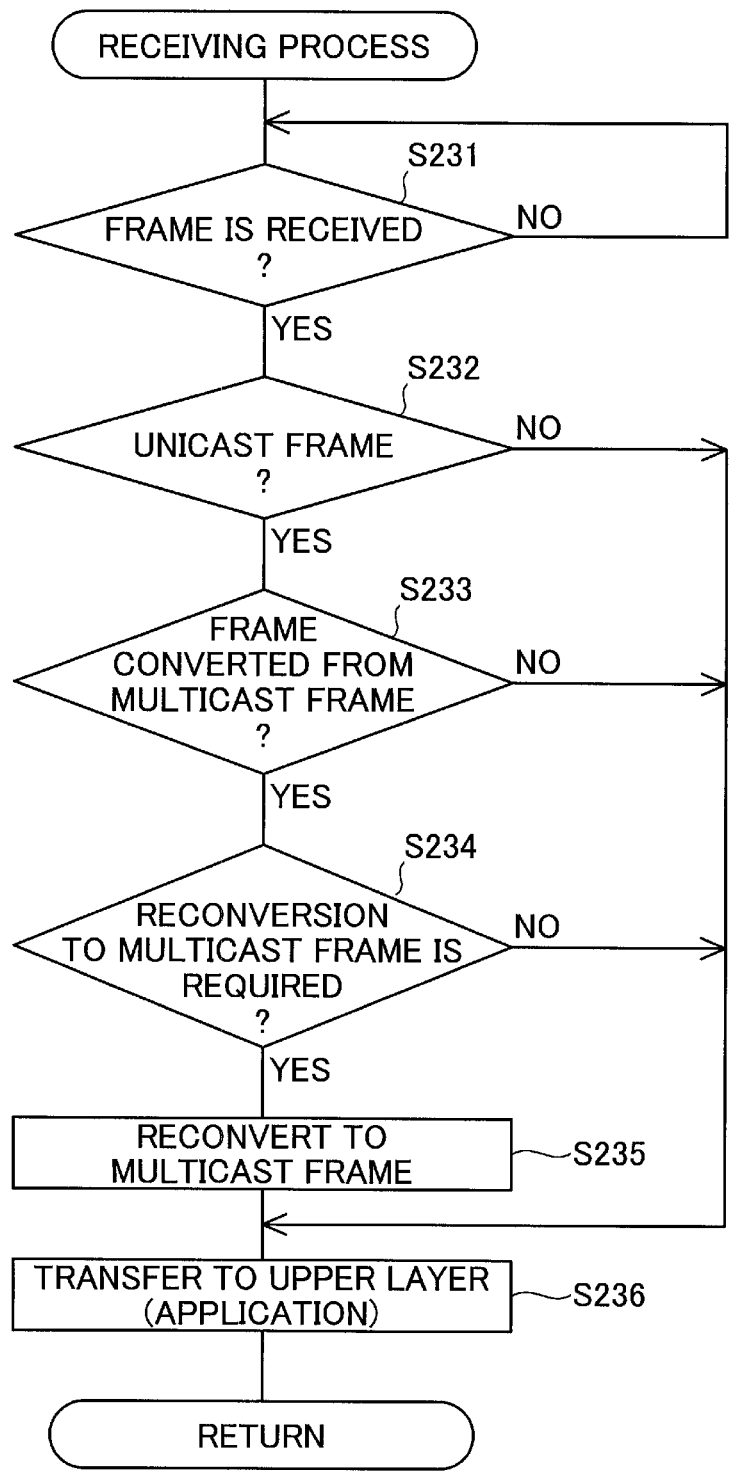
FIG. 8 is the flowchart of a receiving process performed in the stream-receiving process.

FIG. 8 is a flow chart for concretely explaining the receiving process. The CPU 60 of the wireless terminal STA1 or specifically the receiver 64 waits to receive any frame (step S231). When receiving a frame (step S231: Yes), the CPU 60 determines whether the received frame is a unicast frame (step S232). If the received frame is a unicast frame (step S232: Yes), the CPU 60 or specifically the conversion determiner 62 determines whether the received unicast frame is a frame converted from a multicast frame (step S233). The determination is performed by referring to the conversion information added to the unicast frame by the access point AP in step S145 described above.

Upon determining that the unicast frame is a frame converted from a multicast frame (step S233: Yes), the CPU 60 determines whether the reconversion of the received unicast frame to the corresponding multicast frame is required for the reproduction of the received unicast frame (step S234). In this embodiment, the result of the decision is obtained by checking whether or not the unicast frame including the port number of the interested application is discarded by referring to the database for the filtering function of the OS. If reconversion is required consequently (step S234: Yes), the CPU 60 or specifically the reconverter 63 reconverts the received unicast frame to the corresponding multicast frame (step S235). After the reconversion, the CPU 60 transfers the reconverted multicast frame to an upper layer or application to reproduce stream data (step S236).

If the received frame is not identified as a unicast frame but identified as a multicast frame in the above decision-making step S232 (step S232: No), on the other hand, then since the application can reproduce the multicast frames, the CPU 60 transfers the received multicast frame to the application in the upper layer without reconversion to reproduce stream data (step S236). Further, if the unicast frame is not a frame converted from a multicast frame in the above decision-making step S233 (step S233: No), then since the received unicast frame is not related to IPTV broadcast, the CPU 60 transfers the received unicast frame to the application in the upper layer without reconversion (step S236). Still further, if reconversion is not required in the above decision-making step S234 (step S234: No), then since the application is made up to adapt to unicast, the CPU 60 transfers the received unicast frame to the application in the upper layer without reconversion (step S236). After the transfer of the received frame to the upper layer, the CPU 60 repeats the above-mentioned receiving process until its next reception of a 'leave' packet from the wireless terminal STA1.

A-3. Effects

The access point AP of the above configuration has the unicast forwarder 31 which converts a received multicast frame to a unicast frame, sets a relatively higher communication rate than the preset communication rate for multicast frame transmission, and forwards the converted unicast frame to the wireless terminals STA1 to STA3 at the relatively higher communication rate. This configuration preferably enables a multicast communication even in the reception of a large volume of data.

The access point AP also has the determiner 32 for checking the availability of converted unicast frames by the application under a preset condition and the prohibiter 36 for prohibiting the conversion of a received multicast frame to a unicast frame after determining the unavailability of unicast frames by the determiner 32. Accordingly, the conversion of a received multicast frame to a unicast frame is prohibited, upon determination of the unavailability of unicast frames is ascertained by the application. This configuration effectively prevents the degradation of the user's convenience by conversion of multicast frames to unicast frames.

Each of the wireless terminals STA1 to STA3 notifies the access point AP of the functional information used to identify the presence or the absence of the function of receiving a unicast frame converted from a multicast frame and transferring the received unicast frame to the application. The access point AP obtains the functional information from each of the wireless terminals STA1 to STA3 and determines the availability of unicast frames by the application based on the presence or the absence of this function. Therefore, a received multicast frame is not converted to a unicast frame to be forwarded to any of the wireless terminals STA1 to STA3 without the function of receiving a unicast frame converted from a multicast frame and transferring the received unicast frame to the application. This configuration effectively avoids the unavailability of frames relayed from the access point AP by the wireless terminals STA1 to STA3 and thereby prevents the degradation of the user's convenience. The functional information is notified to the access point AP by inclusion in a management frame required for communication between the access point AP and each of the wireless terminals STA1 to STA3. There is accordingly no need of any specific communication for the purpose of only notification of the functional information. This configuration preferably simplifies the system configuration and does not increase the network loading which may have otherwise be incurred by additional notification.

The access point AP estimates the duration D for conversion of a received multicast frame to a unicast frame and transmission of the converted unicast frame and determines the availability of unicast frames by the application based on the result of determination whether the estimated duration D is within the available range for transmission by the access point AP. This configuration effectively prevents a significant loss of frames to be received by the wireless terminals STA1 to STA3 from being induced by conversion of multicast frames to unicast frames and transmission of converted unicast frames, thereby preventing the degradation of the user's convenience.

The access point AP further includes the appender 37 for adding the conversion information, which instructs the execution of conversion from a received multicast frame to a unicast frame, to the converted unicast frame before being forwarded to the wireless terminals STA1 to STA3. Each of the wireless terminals STA1 to STA3 receives the unicast frame and performs an adequate series of processing operations based on the conversion information included in the unicast frame. This configuration assures the effective use of received unicast frames.

Each of the wireless terminals STA1 to STA3 has the conversion determiner 62 for determining whether a received unicast frame is a frame converted from a multicast frame by referring to the conversion information added to the unicast frame before being forwarded by the access point AP, and the reconverter 63 for reconverting the received unicast frame to a multicast frame upon determining the converted unicast frame and transfer the reconverted multicast frame to the application. That is, decision is made on whether a received unicast frame is a frame converted from a multicast frame, based on the conversion information added to the received unicast frame. After the received unicast frame is identified as the converted frame, the received unicast frame is reconverted to a multicast frame, which is then transferred to the application. This configuration assures the effective use of received unicast frame even when the application in the wireless terminal is adapted to the reception of multicast frames.

If the received unicast frame can be directly transferred to the application, each of the wireless terminals STA1 to STA3 does not reconvert a received unicast frame to a multicast frame. This configuration enhances the efficiency and the speed of the processing.

B. Second Embodiment

Figure 9:
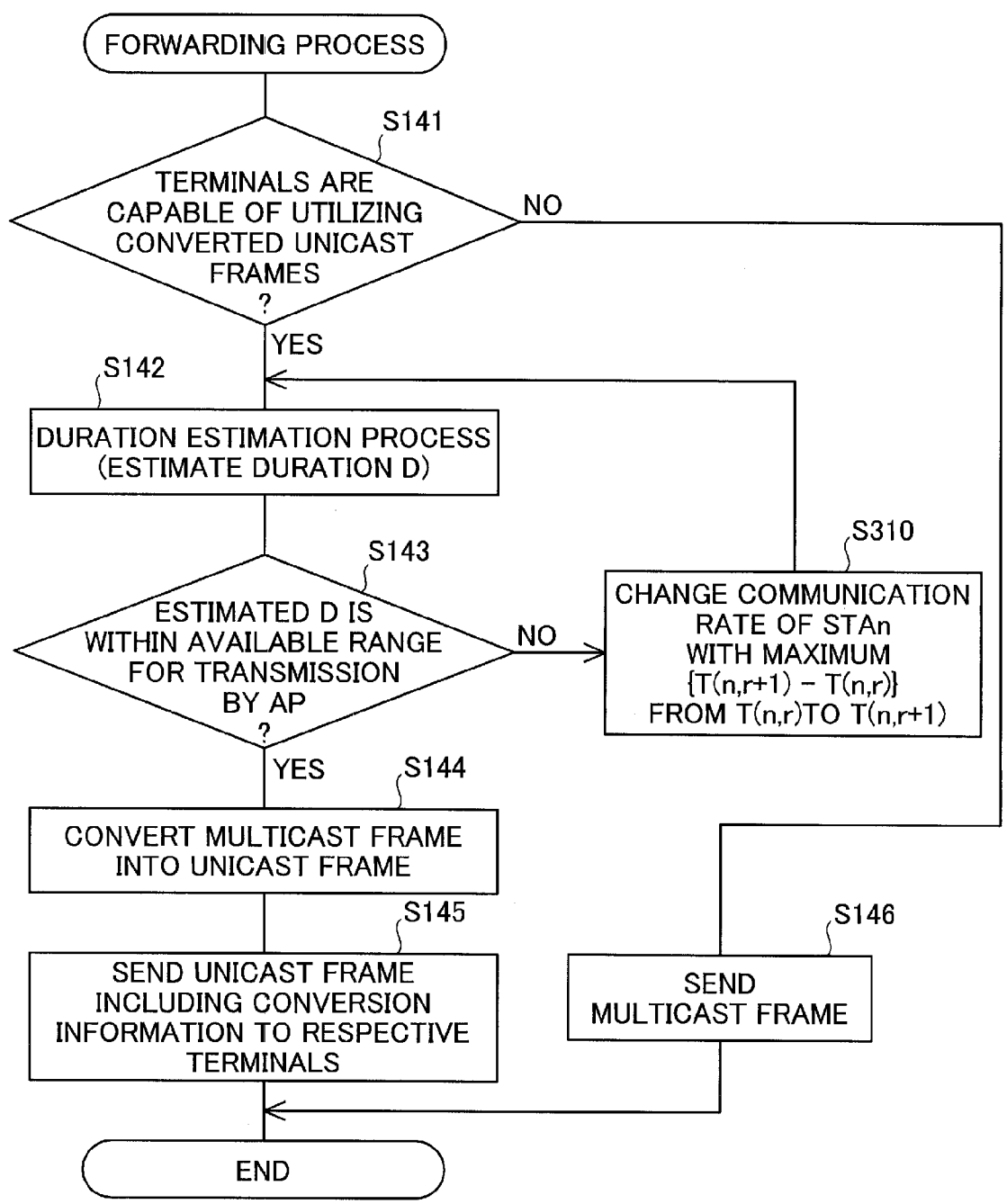
FIG. 9 is the flowchart of a forwarding process performed in a second embodiment.

A second embodiment of the invention is described. The structures of the access point AP and the wireless terminals STA1 to STA3 in the second embodiment are basically the same as those in the first embodiment. The difference between the second embodiment and the first embodiment is only the flow of forwarding process performed by the access point AP. The following describes only the difference from the first embodiment, and like items are not described herein. The flow of the forwarding process in the second embodiment is shown in FIG. 9. The steps in the forwarding process of FIG. 9 substantially identical with those in the forwarding process of the first embodiment shown in FIG. 5 are indicated at the same step numbers and are not specifically explained here. The following describes only part of the flow different from that of the first embodiment.

In the forwarding process of the second embodiment, when it is determined that the estimated duration D is outside of the available range for transmission by the access point AP (step S143: No), the CPU 30 or specifically the determiner 32 changes the communication rate of one of the wireless terminals STA1 to STA3 from the currently set optimum level to a relatively higher level (step S310). In other words, when the communication rate currently set in a wireless terminal STAn is T(n,r), where 'n' is an integer of 1 to 3 and 'r' denotes the step number shown in FIG. 6, the CPU 30 computes ΔTn according to Expression (2) given below with regard to each of the wireless terminals STA1 to STA3:

$$\Delta Tn = T(n, r+1) - T(n, r) \qquad (2)$$

As clearly understood from Expression (2), ΔTn represents the difference between the currently set communication rate and the relatively higher communication rate raised by one step from the currently set communication rate. The CPU 30 changes the currently set communication rate T(n,r) to the one-step higher communication rate T(n,r+1) with respect to a wireless terminal STAn having a relatively larger (i.e., maximum) ΔTn.

After such a change of the communication rate, the CPU 30 returns the processing flow to step S142 to perform the duration estimation process again based on the changed communication rate and repeats the determination of step S143. The CPU 30 repeats the processing of steps S142, S143, and S310 until the estimated duration D falls into the available range for transmission by the access point AP (step S143: Yes).

When the estimated duration D is outside of the available range for transmission by the access point AP, the access point AP changes the communication rate of the converted unicast frame from the preset level to the relatively higher level and again determines whether the estimated duration D is within the available range for transmission by the access point AP. The series of processing operations increase the frequency of forwarding a converted unicast frame under the condition that the estimated duration D is within the available range for transmission by the access point AP, while avoiding a significant loss of frames to be received by the wireless terminals STA1 to STA3. This configuration increases the frequency of multicast communication with a large volume of data, thereby enhancing the user's convenience.

The access point AP of this embodiment selects one of the wireless terminals STA1 to STA3 as the object for a change of the communication rate, based partially on at least the differences between the communication rates currently set in the respective wireless terminals STA1 to STA3 and the relatively higher communication rates respectively raised by one step from the currently set communication rates among the communication rates supported by the respective wireless terminals STA1 to STA3. The access point AP subsequently changes the currently set communication rate to a one-step higher communication rate with respect to the selected wireless terminal. The wireless terminal selected as the object for a change of the communication rate has a relatively greater effect of changing the communication rate from the currently set communication rate to the one-step higher communication rate on the decrease in the estimated duration D. This configuration assures a greater effect on the estimated duration D due to the change of the communication rate. Changing the communication rate to the relatively higher communication rate by a single step minimizes the influence on the availability of unicast frames by the selected wireless terminal as the object for a change of the communication rate.

The series of processing operations to change the communication rate of the converted unicast frame from the preset level to the relatively higher level are repeated until the estimated duration D falls in the available range for transmission by the access point AP. The repetition of the processing prevents the conversion of a received multicast frame to a unicast frame from being prohibited for the reason that the estimated duration D is outside of the available range for transmission by the access point AP. This configuration increases the frequency of multicast communication with a large volume of data, thereby enhancing the user's convenience.

C. Third Embodiment

Figure 10:
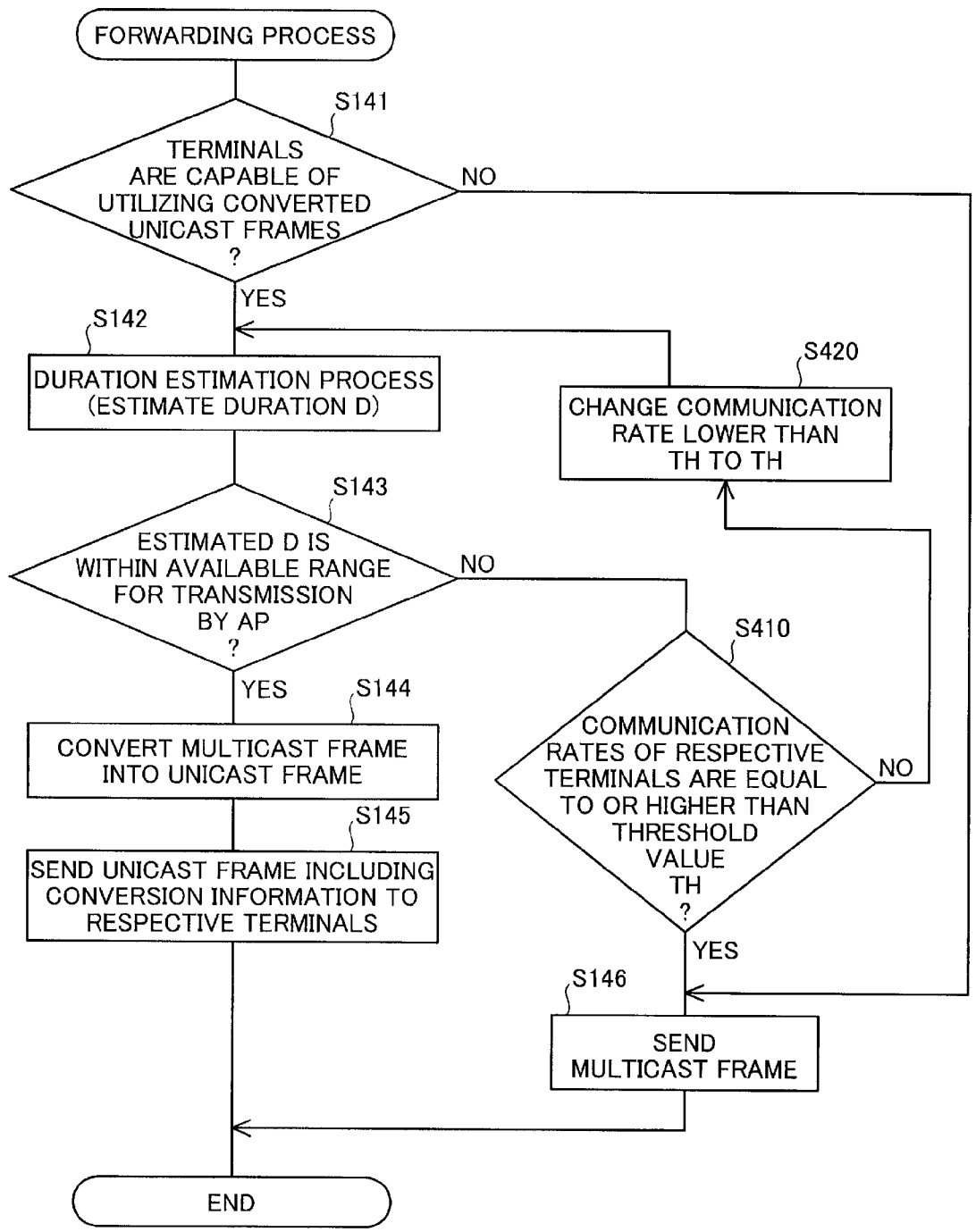
FIG. 10 is the flowchart of a forwarding process performed in a third embodiment.

A third embodiment of the invention is described. The structures of the access point AP and the wireless terminals STA1 to STA3 in the third embodiment are basically the same as those in the first embodiment. The difference between the third embodiment and the first embodiment is only the flow of the forwarding process performed by the access point AP. The following describes only the difference from the first embodiment, and the same items as those of the first embodiment are not described herein. The flow of the forwarding process in the third embodiment is shown in FIG. 10. The steps in the forwarding process of FIG. 10 substantially identical with those in the forwarding process of the first embodiment shown in FIG. 5 are indicated at the same step numbers and are not explained here. The following describes only the part of flow different from that of the first embodiment.

In the forwarding process of the third embodiment, when it is determined that the estimated duration D is outside of the available range for transmission by the access point AP (step S143: No), the CPU 30 or specifically the determiner 32 determines whether the optimum communication rates set in the wireless terminals STA1 to STA3 are equal to or higher than a preset threshold value TH (step S410).

When any of the optimum communication rates set in the wireless terminals STA1 to STA3 is lower than the preset threshold value TH (step S410: No), the CPU 30 or specifically the determiner 32 changes the communication rate lower than the preset threshold value TH to the threshold value TH (step S420). After such a change of the communication rate, the CPU 30 returns the processing flow to step S142 to perform the duration estimation process again based on the changed communication rate and repeats the operation of determination in step S143.

When all the optimum communication rates set in the wireless terminals STA1 to STA3 are equal to or higher than the preset threshold value TH (step S410: Yes), on the other hand, the CPU 30 forwards the received multicast frame at the communication rate preset for forwarding multicast frames (step S146).

When the currently set communication rate is lower than the preset threshold value TH, the access point AP of this embodiment changes the currently set communication rate to the preset threshold value TH. This configuration can effectively suppress the degradation of the convenience of overall multicast communication in the wireless LAN system due to the presence of a wireless terminal having an extremely low communication rate.

The forwarding process of the embodiment uses only one threshold value TH for the determination operation in step S410. Alternatively, two or more different threshold values TH may be used for the determination in step S410. In this modification, the CPU 30 may sequentially select different threshold values TH in an ascending order from a minimum threshold value THmin to a maximum threshold value THmax. Even when the maximum threshold value THmax fails to cause the estimated duration D fall in the available range for transmission by the access point AP (step S143: No), the CPU 30 may forward the received multicast frame at a communication rate preset for forwarding multicast frames (step S146). This modified configuration can minimize the reduction of the convenience with regard even to a wireless terminal having an extremely low communication rate.

D. Fourth Embodiment

Figure 11:
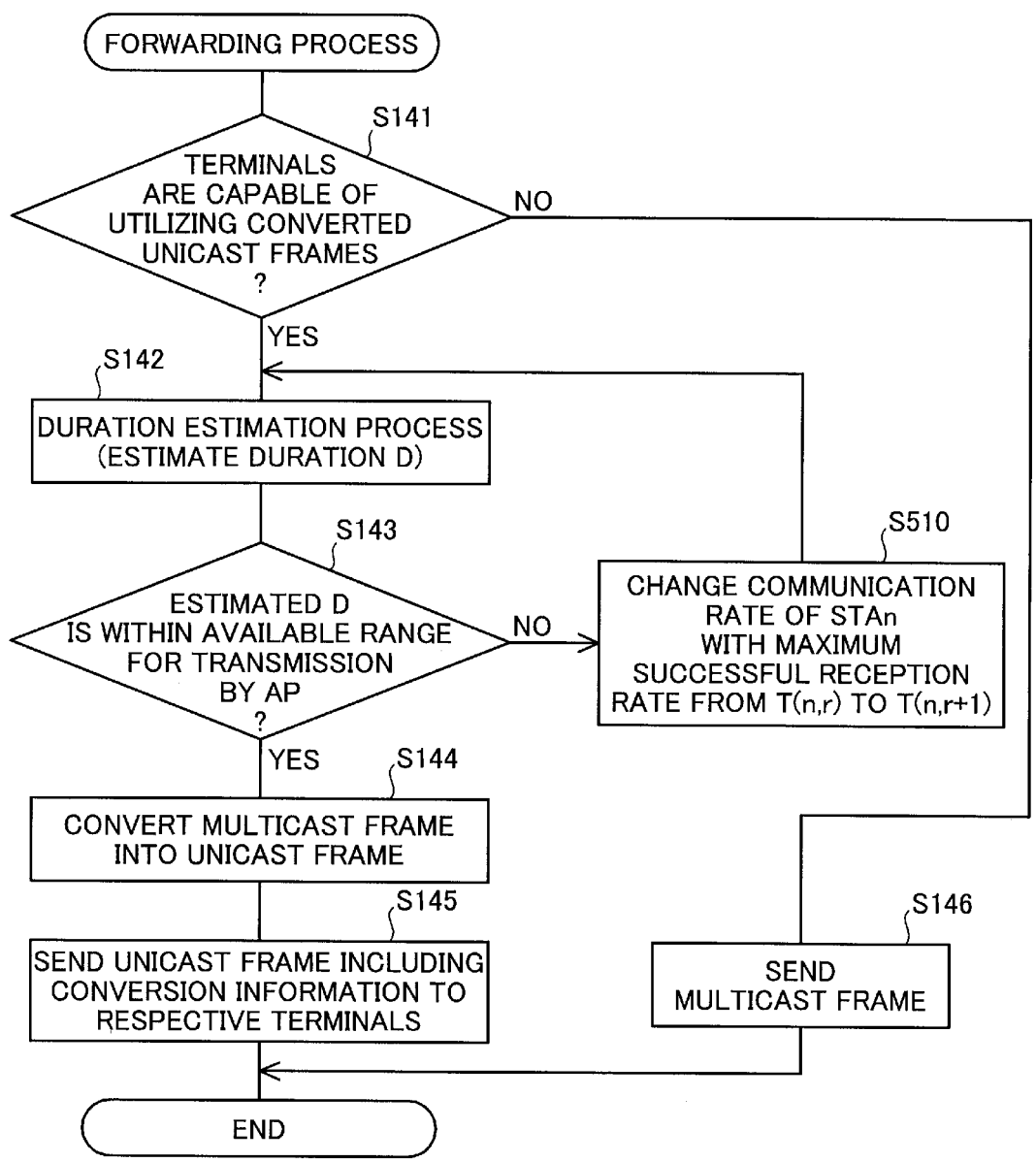
FIG. 11 is the flowchart of a forwarding process performed in a fourth embodiment.

A fourth embodiment of the invention is described. The structures of the access point AP and the wireless terminals STA1 to STA3 in the fourth embodiment are basically the same as those in the first embodiment. The difference between the fourth embodiment and the first embodiment is only part of the flow of the forwarding process performed by the access point AP. The following describes only the difference from the first embodiment, and the same items as those of the first embodiment are not described herein. The flow of the forwarding process in the fourth embodiment is shown in FIG. 11. The steps in the forwarding process of FIG. 11 substantially identical with those in the forwarding process of the first embodiment shown in FIG. 5 are indicated at the same step numbers and are not explained here. The following describes only the part of flow different from that of the first embodiment.

In the forwarding process of the fourth embodiment, when it is determined that the estimated duration D is outside of the available range for transmission by the access point AP (step S143: No), the CPU 30 or the determiner 32 changes the communication rate of one of the wireless terminals STA1 to STA3 from the currently set optimum level to a relatively higher level (step S510). In other words, the CPU 30 changes the communication rate of a wireless terminal STAn among the wireless terminals STA1 to STA3, having the maximum successful reception rate for frames sent within a predetermined past time period from a currently set communication rate $T(n,r)$ to a one-step higher communication rate $T(n,r+1)$.

The rate of successful reception is obtained by counting the number of ACKs given as replies from the wireless terminals STA1 to STA3 in response to the transmission of frames to the wireless terminals STA1 to STA3. The rate of successful reception may be replaced with the rate of reception failure.

After such a change of the communication rate, the CPU 30 returns the processing flow to step S142 to perform the duration estimation process again based on the changed communication rate and repeats the determination operation in step S143. The CPU 30 repeats the processing of steps S142, S143, and S510 until the estimated duration D falls in the available range for transmission by the access point AP (step S143: Yes).

The access point AP of this embodiment selects one of the wireless terminals STA1 to STA3 as the object for a change of the communication rate, based partially on at least the rates of successful reception for forwarded frames in the respective wireless terminals STA1 to STA3. The access point AP subsequently changes the currently set communication rate to a relatively higher communication rate with respect to the selected wireless terminal. This configuration effectively prevents the change of the communication rate from lowering the successful reception rate to such an extent as to significantly affect the availability of unicast frames. This effect is remarkable since the communication rate is successively changed to a relatively higher communication rate with respect to the wireless terminal having the highest successful reception rate or the most stable wireless communication.

E. Modifications

Some modifications of the above embodiments are described below.

E-1. Modification 1

The second through the fourth embodiments describe various algorithms of the forwarding process to change the communication rate of one of the wireless terminals STA1 to STA3 from the currently set optimum level to a relatively higher level when the estimated duration D is outside of the available range for transmission by the access point AP (step S143: No). At least two of these algorithms may be performed in combination. For example, the algorithm of the second embodiment may be performed in combination with the algorithm of the third embodiment. This modification may perform the algorithm of the second embodiment when the estimated duration D is still outside of the available range for transmission by the access point AP even after the change of the communication rate lower than the preset threshold value TH to the threshold value TH.

In another example, the algorithm of the second embodiment may be performed in combination with the algorithm of the fourth embodiment. The modification may perform the algorithm of the second embodiment on the condition that the successful reception rate is not lowered to or below a predetermined reference value. Alternatively the modification may compute an evaluation value from the successful reception rate and the difference ΔTn weighted with preset adjustment factors with regard to the respective wireless terminals STA1 to STA3 and select a wireless terminal STAn as the object for a change of the communication rate based on the computed evaluation values. These combinations achieve a balance between the effects of the respective algorithms, while enabling flexible determination of the availability of unicast frames in the respective wireless terminals STA1 to STA3.

The algorithm of the forwarding process to change the communication rate from a currently set level to a relatively higher level is not restricted to the embodiments or the above modifications but may be implemented in various forms. For example, the communication rate may be sequentially changed in an ascending order from the lowest communication rate to highest communication rate step by step.

E-2. Modification 2

In the forwarding processes of the second and the fourth embodiments described above, the change of the communication rate is repeated until the estimated duration D falls in the available range for transmission by the access point AP. There may be an upper limit as the criterion of such repetition. The upper limit criterion may be, for example, a value for the communication rate or a value for the successful reception rate. This modified configuration prevents the quality of streaming image from being excessively lowered by converting multicast frames to unicast frames.

E-3. Modification 3

In the forwarding process of the embodiment described above, when it is determined that there is at least one wireless terminal incapable of utilizing unicast frames (step S141: No), the CPU 30 forwards a received multicast frame without conversion to a unicast frame. This processing flow is, however, neither essential nor restrictive. For example, when there is at least one wireless terminal capable of utilizing unicast frames, a modified procedure may forward a unicast frame converted from a received multicast frame to the at least one wireless terminal. The modified procedure may estimate a duration D for transmission of the converted unicast frame together with the received multicast frame to all the wireless terminals with the restrictive transmission of the converted unicast frame, and determines whether such transmission is allowed, based on the estimated duration D. In this modified application, the at least one wireless terminal capable of utilizing unicast frames receives both the multicast frame and the converted unicast frame. There may be an additional step of regarding frames having the same sequence number as frames having the same content in their frame body and discarding a frame received at a later timing. This modified configuration enables the wireless terminal capable of utilizing unicast frames to receive a large volume of data, thus enhancing the user's convenience.

E-4. Modification 4

The above embodiments describe the application of the invention to the wireless LAN system 20. The principle of the invention is, however, not restricted to the wireless LAN system but may be applied to various multicast communication systems, such as a PLC (Power Line Communication) system. In this application, a modem as a PLC base station may have a structure equivalent to that of the access point AP, while electronic devices as PLC adapters may have a structure equivalent to those of the wireless terminals STA1 to STA3.

The above embodiments describe IPTV streaming communication. The principle of the invention is, however, not restricted to the IPTV stream communication but may be applied to various types of multicast communications, such as multicast communication utilizing VoIP (Voice over Internet Protocol) to enable simultaneous conversations of three or more people and multicast communication capable of simultaneous uploads to multiple network-attached storages (NAS) connected to a network.

E-5. Modification 5

The second through the fourth embodiments adopt various algorithms of the forwarding process to change the communication rate of one of the wireless terminals STA1 to STA3 from the currently set optimum level to a relatively higher level so as to cause the estimated duration D to fall in the available range for transmission by the access point AP. These algorithms may also preferably used for the purpose of decreasing the duration D to or below a preset value. This modified configuration enables high-speed multicast communication, while preventing the excessive occupancy of the transmission capacity of the access point AP.

The embodiments of the invention and their modifications are described above. Among the various components included in the embodiments discussed above, those other than the components included in the attached independent claims are supplementary elements and may be omitted or combined according to the requirements. The embodiments and their modifications discussed above are to be considered in all aspects as illustrative and not restrictive. There may be many other modifications, changes, and alterations without departing from the scope or spirit of the present invention. The technique disclosed in the invention is not restricted to the applications to the relay apparatus, the communication apparatus, and the communication system but may also be realized in diversity of other applications, such as, for example, a communication method involved in frame relay or frame reception and a program product, such as a recording medium, with a program for realizing the relevant functions recorded therein.

What is claimed is:

1. A relay apparatus for forwarding a received multicast frame to a communication apparatus at a specified communication rate, comprising:
   an access point determiner that determines whether or not the communication apparatus can utilize a unicast frame that is converted from the received multicast frame, based on a specified condition that includes a transmission available condition, and wherein the access point determiner estimates a duration required for the transmission of the converted unicast frame and determines whether or not the estimated duration is within an available range for transmission by the relay apparatus;
   an access point prohibiter that prohibits a conversion of the multicast frame to the unicast frame when the access point determiner negates the availability; and
   an access point unicast forwarder that executes the conversion, that sets a relatively higher communication rate than the specified communication rate, and that forwards the converted unicast frame to the communication apparatus at the relatively higher communication rate;
   wherein the access point determiner includes: an access point acquirer that obtains information which represents the presence of a function of receiving the converted unicast frame from the communication apparatus, and transferring the received unicast frame to the application; and
   the specified condition includes a functional condition that the communication apparatus has the specific function.

2. The relay apparatus in accordance with claim 1, wherein the access point acquirer obtains the information by referring to functional information included in an association request sent by the communication apparatus.

3. The relay apparatus in accordance with claim 1, wherein if the transmission available condition is not satisfied, the access point determiner changes the communication rate of the converted unicast frame from the currently set value to a relatively higher value and performs a determination operation based on the transmission available condition again.

4. The relay apparatus in accordance with claim 3, wherein the access point determiner specifies the communication apparatus having the currently set communication rate lower than a predetermined threshold value as an object for changing the currently set communication rate and changes the currently set communication rate from the current value to the predetermined threshold value.

5. The relay apparatus in accordance with claim 3, wherein the relay apparatus communicates with a plurality of communication apparatuses, and
   the access point determiner selects one of the plural communication apparatuses as an object for a change of the communication rate, based partially on at least differences between the communication rates currently set in the plural communication apparatus and one-step higher communication rates respectively raised by one step from the currently set communication rates among available communication rates supported by the plural communication apparatuses, and changes the communication rate from the currently set value to the one-step higher value with regard to the selected communication apparatus.

6. The relay apparatus in accordance with claim 3, wherein the relay apparatus communicates with a plurality of communication apparatuses, and
   the access point determiner selects one of the plural communication apparatuses as an object for a change of the communication rate, based partially on at least successful reception rates of frames forwarded by the relay apparatus in the plural communication apparatuses, and changes the communication rate from the currently set value to the relatively higher value with regard to the selected communication apparatus.

7. The relay apparatus in accordance with claim 3, wherein the access point determiner repeats the change of the communication rate and the determination based on the transmission available condition until the transmission available condition has been fulfilled.

8. A communication apparatus, comprising:
   a wireless station receiver that receives a unicast frame converted from a multicast frame;
   a relay apparatus;
   a wireless station notifier that notifies the relay apparatus, which is capable of converting a multicast frame to a unicast frame, of functional information used to identify the presence of a function of transferring the received unicast frame to an application installed in the communication apparatus to utilize the received unicast frame;
   the relay apparatus for forwarding a received multicast frame to a communication apparatus at a specified communication rate, comprising:
   an access point determiner that determines whether or not the communication apparatus can utilize a unicast frame that is converted from the received multicast frame based on a specified condition that includes a transmission available condition, and wherein the access point determiner estimates a duration required for the transmission of the converted unicast frame and determines whether or not the estimated duration is within an available range for transmission by the relay apparatus;
   an access point prohibiter that prohibits a conversion of the multicast frame to the unicast frame when the access point determiner negates the availability; and
   an access point unicast forwarder that executes the conversion, that sets a relatively higher communication rate than the specified communication rate, and that forwards the converted unicast frame to the communication apparatus at the relatively higher communication rate;
   wherein the access point determiner includes: an access point acquirer that obtains information which represents the presence of a function of receiving the converted unicast frame from the communication apparatus, and transferring the received unicast frame to the application; and the specified condition includes a functional condition that the communication apparatus has the specific function.

9. The communication apparatus in accordance with claim 8, the communication apparatus being a wireless LAN terminal, wherein the wireless station notifier accomplishes the notification by including the functional information in the management frame transmitted to and from the relay apparatus.

10. A communication system including a communication apparatus and a relay apparatus that forwards a received multicast frame to the communication apparatus at a specified communication rate, the communication apparatus comprising:

a wireless station notifier that notifies the relay apparatus of functional information used to identify the presence or absence of a function of receiving a unicast frame converted from a multicast frame and transferring the received unicast frame to an application, and the relay apparatus comprising:

an access point determiner that obtains the functional information notified by the communication apparatus and that determines an availability of the converted and forwarded unicast frame by the application, based on a specified condition including the functional information and wherein the access point determiner estimates a duration required for the transmission of the converted unicast frame and determines whether or not the estimated duration is within an available range for transmission by the relay apparatus;

an access point prohibiter that prohibits a conversion from the received multicast frame to the unicast frame when the access point determiner negates the availability; and an access point unicast forwarder that executes the conversion, that sets a relatively higher communication rate than the specified communication rate, and that forwards the converted unicast frame to the communication apparatus at the relatively higher communication rate;

wherein the access point determiner includes: an access point acquirer that obtains information which represents the presence of a function of receiving the converted unicast frame from the communication apparatus, and transferring the received unicast frame to the application; and the specified condition includes a functional condition that the communication apparatus has the specific function.

11. A relay method of relaying a multicast frame received by a relay apparatus, wherein the relay apparatus forwards the received multicast frame to a communication apparatus at a specified communication rate, the relay method comprising the steps of:

receiving from the communication apparatus, functional information used to identify the presence of a function of receiving a unicast frame converted from the multicast frame and transferring the received unicast frame to an application installed in the communication apparatus;

determining whether or not the communication apparatus can utilize a unicast frame that is converted from the received multicast frame, based on the functional information notified by the communication apparatus, estimating a duration required for the transmission of the converted unicast frame, and determining whether or not the estimated duration is within an available range for transmission by the relay apparatus;

converting the received multicast frame to the unicast frame when the determiner affirms the availability, setting a communication rate relatively higher than the specified communication rate, and forwarding the converted unicast frame to the communication apparatus at the relatively higher rate; and forwarding the received multicast frame to the communication apparatus at the specified communication rate without converting to the unicast frame when the determiner negates the availability;

wherein the determining includes: obtaining information which represents the presence of a function of receiving the converted unicast frame from the communication apparatus, and transferring the received unicast frame to the application; and the specified condition includes a functional condition that the communication apparatus has the specific function.

* * * * *